(12) United States Patent
Studnicka (10) Patent No.: US 11,461,453 B2
(45) Date of Patent: Oct. 4, 2022

(54) MODIFICATION OF USER ACCOUNT FUNCTIONALITY BASED ON A PHYSICAL STATE OF A MOBILE DEVICE

(71) Applicant: PayPal, Inc., San Jose, CA (US)

(72) Inventor: Todd Murray Studnicka, Omaha, NE (US)

(73) Assignee: PayPal, Inc., San Jose, CA (US)

( * ) Notice: Subject to any disclaimer, the term of this patent is extended or adjusted under 35 U.S.C. 154(b) by 645 days.

(21) Appl. No.: 16/212,290

(22) Filed: Dec. 6, 2018

(65) Prior Publication Data

US 2020/0184063 A1  Jun. 11, 2020

(51) Int. Cl.
*G06F 7/04* (2006.01)
*G06F 15/16* (2006.01)
(Continued)

(52) U.S. Cl.
CPC ............ *G06F 21/40* (2013.01); *H04L 63/102* (2013.01); *H04W 4/026* (2013.01); *H04W 4/029* (2018.02);
(Continued)

(58) Field of Classification Search
CPC ........ G06F 21/30; G06F 21/31; G06F 21/316; G06F 21/34; G06F 21/40; G06F 21/44; G06F 21/45; G06F 2221/2139; H04W 4/02; H04W 4/026; H04W 4/027; H04W 12/06; H04W 4/029; H04W 12/084; H04W 12/68; H04W 12/63; H04W 12/37; H04W 88/02;
(Continued)

(56) References Cited

U.S. PATENT DOCUMENTS 6,934,664 B1 * 8/2005 Webb ..................... G06Q 20/20
702/188
2011/0124350 A1 * 5/2011 Sukovic ................ H04W 4/029
455/456.3
(Continued)

FOREIGN PATENT DOCUMENTS

KR   20170004400   1/2017
WO   2015/062256   5/2015

OTHER PUBLICATIONS

How to use Do Not Disturb While Driving—Apple Support, https://support.apple.com/en-us/HT208090, Apple Inc., 2018, 3 pages. [Retrieved Nov. 30, 2018].

(Continued)

*Primary Examiner* — Trong H Nguyen
(74) *Attorney, Agent, or Firm* — Kowert, Hood, Munyon, Rankin & Goetzel, P.C.; Dean M. Munyon (57) ABSTRACT

Techniques are disclosed relating to the modification of user account functionality based on a physical state of a mobile device. For example, in some embodiments, a mobile device may detect one or more physical states associated with the device. The mobile device may compare the one or more physical states to a set of rules for a user account associated with a user, where a given one of the set of rules specifies one or more functionalities, of the user account, to modify in response to one or more of the rules being satisfied. Further, in response to the one or more physical states satisfying a first rule of the set of rules, the mobile device (Continued)

may send, to a server system associated with the user account, a request to modify one or more functionalities associated with the user account.

19 Claims, 7 Drawing Sheets

(51) Int. Cl.
*H04L 29/06* (2006.01)
*G06F 21/40* (2013.01)
*H04W 4/02* (2018.01)
*H04L 9/40* (2022.01)
*H04W 12/06* (2021.01)
*H04W 4/029* (2018.01)
*H04W 12/30* (2021.01)
*H04W 12/63* (2021.01)

(52) U.S. Cl.
CPC .......... *H04W 12/06* (2013.01); *H04W 12/30* (2021.01); *H04W 12/63* (2021.01)

(58) Field of Classification Search
CPC ...... H04W 12/08; H04L 63/10; H04L 63/101; H04L 63/102; H04L 63/105; H04L 63/107
See application file for complete search history.

(56) References Cited

U.S. PATENT DOCUMENTS

| | | | |
|---|---|---|---|
| 2011/0189981 A1 | 8/2011 | Faith et al. | |
| 2015/0133098 A1* | 5/2015 | Warr | H04W 68/04 455/418 |
| 2015/0186881 A1* | 7/2015 | Doris-Down | G06Q 20/4016 705/44 |
| 2016/0057248 A1* | 2/2016 | Tankha | H04W 12/08 726/6 |
| 2018/0114015 A1* | 4/2018 | Nuseibeh | H04L 63/107 |
| 2018/0314684 A1 | 11/2018 | Johnson, Jr. et al. | |
| 2019/0158487 A1 | 5/2019 | Hayes et al. | |
| 2019/0208418 A1 | 7/2019 | Breu | |
| 2019/0253258 A1 | 8/2019 | Thekadath et al. | |
| 2020/0137213 A1* | 4/2020 | Kaladgi | H04L 67/1097 |

OTHER PUBLICATIONS

International Search Report and Written Opinion in Appl. No. PCT/US2019/064420 dated Mar. 30, 2020, 10 pages.
International Application No. PCT/US2019/064420, International Preliminary Report on Patentability dated Jun. 17, 2021, 8 pages.

* cited by examiner

MODIFICATION OF USER ACCOUNT FUNCTIONALITY BASED ON A PHYSICAL STATE OF A MOBILE DEVICE

BACKGROUND

Technical Field

This disclosure relates generally to data security, and more particularly to modifying the functionality of a user account based on a physical state of a mobile device associated with the user account.

Description of the Related Art

Server systems, such as web servers, application servers, email servers, etc., may provide various computing resources and services to an end user. For example, a web service may use one or more server systems to provide access to software applications to remote users via a network. A web service will commonly limit access to its resources and services to only those users with a valid user account with the service. One method for limiting access to a web service is to require an end user to establish a user account and authentication credentials (e.g., a username and password), and to require end users to provide valid credentials to the server system prior to gaining access to the service. Once authenticated, a user is typically authorized to access various items of information and to perform various operations associated with the user account.

In some instances, however, such user credentials may be discovered by an unauthorized third-party (e.g., through a phishing attack, brute-force attack, etc.), presenting security concerns. For example, once an unauthorized third-party discovers a user's valid credentials, the unauthorized third-party may access the web service, including the various functionalities and features accessible to the user account, to the same extent as the authorized user.

SUMMARY

Techniques are disclosed relating to the modification of user account functionality based on a physical state of a mobile device. For example, in some embodiments, a mobile device may detect one or more physical states associated with the device. The mobile device may compare the one or more physical states to a set of rules for a user account associated with a user, where a given one of the set of rules specifies one or more functionalities, of the user account, to modify in response to one or more of the rules being satisfied. Further, in response to the one or more physical states satisfying a first rule of the set of rules, the mobile device may send, without explicit user input to a server system associated with the user account, a request to modify one or more functionalities associated with the user account.

Further, in various embodiments, a server system may determine whether to authorize a request to perform an action associated with a user account based on the physical state of a mobile device. For example, a server system may receive a request to perform an action associated with an account of a user. The server system may access information indicative of a current physical state of a mobile device associated with the account. As one non-limiting example, this information may indicate a physical orientation of the mobile device. The server system may then determine whether to authorize the action based on the current physical state of the mobile device.

DETAILED DESCRIPTION

Server systems implement various techniques in an effort to limit unauthorized access to web services. As noted above, one common technique is to require a requesting user to provide authentication credentials that may be validated (e.g., by the server system or a separate authentication server) prior to providing the user with access to a user account. Once authenticated, a user may be authorized to perform various operations associated with the user account. The nature of the user's access will vary depending on the type of web service at-issue. For example, in the case of an email service, an authenticated user may be authorized to access previously sent and received emails, send new emails from the user account, etc. If, for example, the web service enables a user to perform financial transactions (e.g., a service associated with a bank or online payment system), the user may be authorized to perform various financial operations, such as transferring money, accessing financial information, etc.

In some instances, however, the reliance on authentication credentials may present security concerns. For example, in the event that a user's authentication credentials are compromised, an unauthorized third-party may access the user account to the same extent as the authorized user. Continuing with the previous example, discovery of a user's authentication credentials for an online payment system may enable the unauthorized user to transfer money, access financial information, etc. to the same extent as the authorized user.

Various efforts have been made to prevent unauthorized access to user accounts. For example, instead of relying on a single authentication factor, such as a user credential, some systems utilize multi-factor authentication systems in which a user must verify his or her identity in multiple ways (that is, using multiple factors) prior to gaining access to a user account. One common implementation of multi-factor authentication is to require the user, during the login process, to provide both a user credential and a one-time passcode sent to a mobile device associated with the user account (e.g., via an out-of-band communication, such as an SMS message).

Such multi-factor authentication techniques also suffer from various shortcomings, however. For example, these multi-factor authentication techniques may be less convenient than conventional authentication credentials alone, requiring explicit input on the part of the user to retrieve and provide the one or more additional authenticating factors (e.g., the one-time passcode) prior to accessing the system. Further, while such multi-factor authentication techniques may improve the security of the user authentication process, they do not allow the user to control the types or levels of access (e.g., to information or functionality) that are available to the user account. Stated differently, existing multi-factor authentication techniques do not allow a user to modify (e.g., temporarily) the types of operations that may be performed via the user account without having the user explicitly modify the account settings.

In various embodiments, however, the disclosed systems and methods may solve these and other technical problems by enabling the modification of user account functionality based on a physical state of a user's mobile device. In some embodiments, a user may establish, for a user account, one or more rules that controls what functionalities of the user account are currently available, where the rules are based on a physical state of the user's mobile device. As one non-limiting example, consider an embodiment in which the user account is associated with an online payment system. In such an instance, the user may establish a rule providing, for example, that when the user's mobile device is in a certain physical state (e.g., it is positioned screen-side down), no outgoing payment transactions may be performed. When the user then places his or her phone screen-side down, the mobile device may detect this physical state and send, to a server system associated with the online payment service, an indication of the physical state of the device. In response to this indication, the server system may disable the user account's ability to make outgoing payment transactions (e.g., temporarily, until it receives a subsequent message from the user device). If, while the user's mobile device is positioned screen-side down, the server system then receives a request from an unauthorized third-party (for example, a third-party that has obtained the user's valid authentication credentials) to make an outgoing payment transaction, the server system may deny this request, as this functionality was temporarily disabled based on the physical orientation of the user's mobile device. Note, however, that this embodiment is provided merely as an example and is not intended to limit the scope of the present disclosure. In other embodiments, various different types of functionality associated with a user account may be modified based on any suitable combination of physical states associated with the mobile device of the user.

Thus, in various embodiments, the physical state of the user's mobile device may be thought of as an additional factor that may be considered (e.g., as part of or in addition to authenticating a user to a user account) when determining whether to authorize a request to perform an action associated with the user account. Stated differently, the physical state of the mobile device may be treated as a "switch," which may be used to modify the functionality associated with one or more user accounts.

Figure 1:
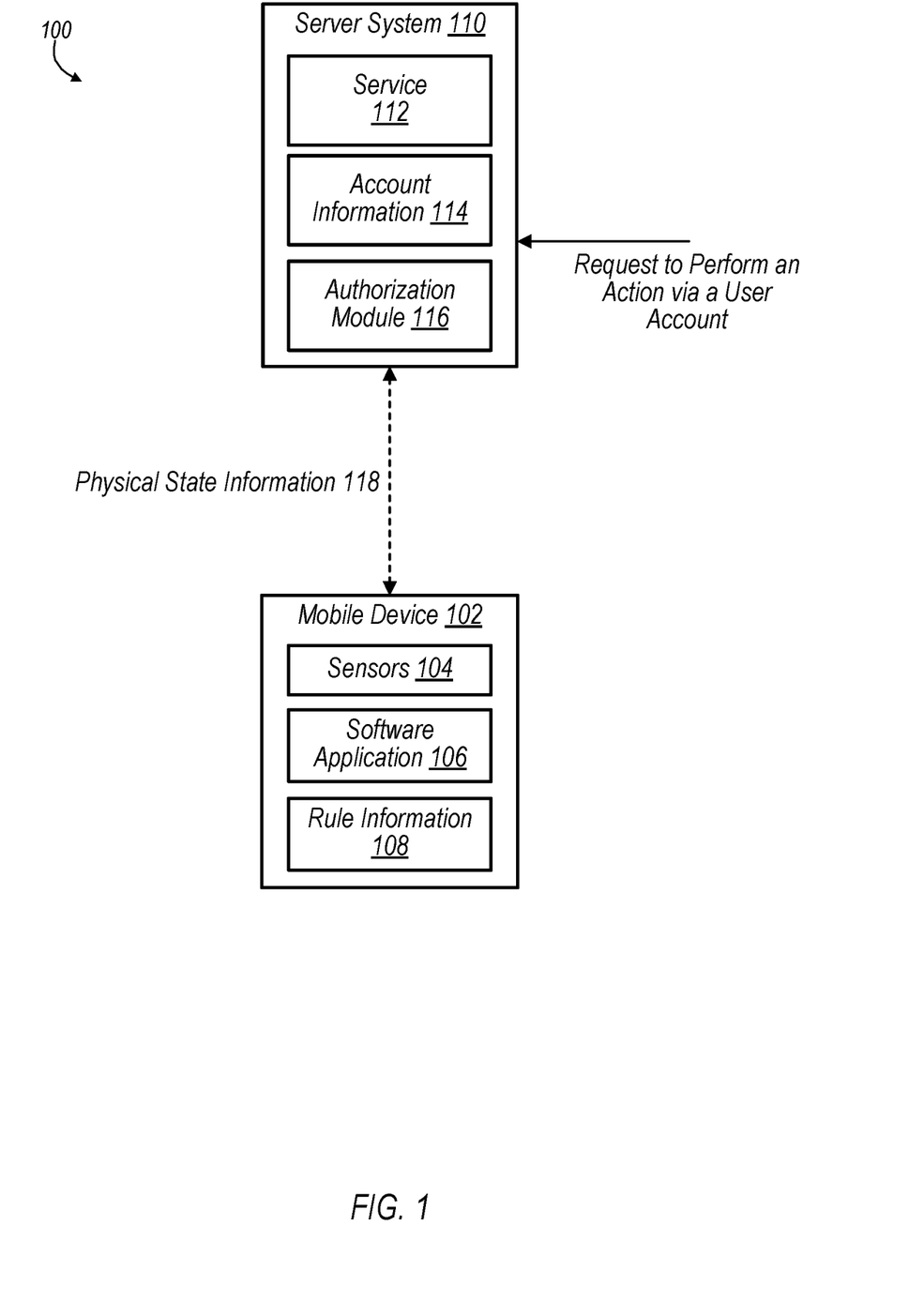
FIG. 1 is a block diagram illustrating a system for modifying the functionality of a user account based on a physical state of a mobile device, according to some embodiments.

Referring now to FIG. 1, a block diagram illustrating a system 100 for modifying the functionality of a user account based on a physical state of a mobile device is shown, according to some embodiments. In the embodiment of FIG. 1, system 100 includes mobile device 102 and server system 110. Note that, although shown in direct communication, mobile device 102 and server system 110 may be connected via one or more communication networks (not shown for clarity).

In various embodiments, server system 110 may host a web service 112 accessible to various remote users via one or more communication networks. For example, in various embodiments, server system 110 may host an email service, streaming service, online payment service, or any other suitable web service 112. Service 112 may include various functionalities to users with valid user accounts. For example, in the following discussion of FIG. 1, reference will be made to an embodiment in which server system 110 hosts an online payment service 112, which provides users with valid user account various functionalities, such as sending and receiving online money transfers, viewing financial statements, etc. Note, however, that this embodiment is provided merely as an example and is not intended to limit the scope of the present disclosure. In other embodiments, the disclosed systems and methods may be implemented in the context of any other suitable web service 112.

In the depicted embodiment, server system 110 includes (or has access to) account information 114 associated with various user accounts for web service 112. This account information 114 may include, for example, access permissions for the user accounts, information regarding the mobile device(s) associated with various user accounts, information associated with the web service 112, etc. For instance, continuing the above example, account information 114 may include information corresponding to one or more financial transaction accounts (e.g., bank accounts) associated with various users of its service 112.

Server system 110 further includes authorization module 116, which, in various embodiments, is operable to determine whether to authorize requests by end users. For example, server system 110 may receive a request to perform an action associated with a particular user account, such as a request to transfer funds from a financial account associated with the particular user account to a financial account of a third-party. Server system 110 may perform various operations in determining whether to authorize such an action. For example, server system 110 may require that the requesting user first be authenticated to the particular user account, using single- or multi-factor authentication techniques. If the requesting user is successfully authenticated to the particular user account, authorization module 116 may take further steps to determine whether such an action should be authorized, for example by consulting access permissions, stored in account information 114, associated with the particular account. In various embodiments, the physical state of mobile device 102 may be used, by server system 110, as a factor in determining whether to authorize an action associated with a user account.

Mobile device 102, in various embodiments, is a mobile device (e.g., smartphone, tablet computer, laptop computer, wearable computing device, or any other suitable mobile computing device) of a user who has a particular user account for the service 112 provided by server system 110. In various embodiments, the user may associate the mobile device 102 with the particular user account, such that the server system 110 may store information associated with the mobile device 102 in the account information 114, communicate with the mobile device 102, etc.

In various embodiments, physical state information 118 may be communicated between the mobile device 102 and the server system 110. As used herein, the term "physical state information" refers to information indicative of a physical state associated with the mobile device 102. The "physical state" associated with a mobile device covers physical states (including physical characteristics) of the mobile device, as well as physical states of the environment in which the mobile device is located. The term "physical state" is expressly intended to exclude the geographical location of the mobile device 102. For example, while information specifying the motion of mobile device 102, such as its relative speed, may be considered "physical state" information, information specifying its absolute geographical location (e.g., latitude and longitude or equivalent coordinates) would be considered "physical location" information rather than "physical state" information. "Physical state" information may thus be considered to indicate one or more states of mobile device 102 at its physical location. Note, however, that physical location information corresponding to mobile device 102 may also be communicated to the server system 110 and, in some embodiments, used along with physical state information corresponding to mobile device 102 to determine whether to authorize an action associated with a user account.

One example of a physical state of mobile device 102 is its current physical orientation, such as whether the device is positioned face-down or face-up, whether it is currently in portrait or landscape mode, its currently viewing angle, etc. Another example of a physical state of mobile device 102 is its current power state, such as whether it is currently being charged, whether the battery is above or below some threshold amount. Still other examples of physical state include whether the device is in motion, whether the device is currently damaged (e.g., screen is cracked). The physical state associated with mobile device 102 also extends to the environment of the device—for example, the ambient temperature. Other examples of a physical state associated with the device's environment are whether the device is currently located in the user's pocket or purse, the amount of light in the environment, or the device's current height (e.g., from the floor).

Mobile device 102 includes various sensors 104, which may be used to detect the physical states—and changes in physical states—of mobile device 102. The particular sensors included in a mobile device 102 may, of course, vary in different embodiments. For example, sensors 104 may include any one or more of the following: cameras, microphones, gyroscopes, magnetometers, accelerometers, proximity sensors (e.g., infrared LEDs or infrared light detectors), barometers, ambient light sensors, fingerprint scanners, or any other suitable sensing device configured to detect physical characteristics associated with the mobile device 102 or the environment in which mobile device 102 is operating.

Mobile device 102 further includes software application 106 and rule information 108. In various embodiments, software application 106 is operable to compare the physical state(s) of the mobile device 102 to one or more rules, provided in rule information 108, for a user account associated with the service 112. In various embodiments, these rules specify functionality of the user account to modify in response to the mobile device 102 being in certain physical states. For example, in keeping with the example above, rule information 108 may include a rule stating that, when the mobile device 102 is oriented face-down, no outgoing money transfers may be performed for the user of mobile device 102's user account. When software application 106 then detects that the mobile device 102 has been placed face-down, it may send physical state information 118 to the server system 110, specifying the physical state of the device 102. Alternatively, in some embodiments, when application 106 detects that mobile device 102 has been placed face-down, it may instead send a message to server system 110, requesting that the ability to perform outgoing payments via the particular user account be disabled. In response, server system 110 may modify the access permissions for the particular user account to indicate that outgoing payments via the particular user account are not to be authorized. If, as in the depicted embodiment, server system 110 then receives a request (e.g., from a third-party that has maliciously discovered the user's credentials and has been authenticated to the service 112) to perform an outgoing payment transaction from the particular user account, the server system 110 will deny this request.

Thus, various disclosed embodiments provide the user with the ability to modify the functionality available to their account with service 112 based on the physical state of their mobile device 102, offering greater control over the actions that are performed via their account. This, in turn, may improve the user experience and, as demonstrated by the example above, improve data security for the service 112, improving the functioning of server system 110 as a whole.

Note, however, that the above-described embodiment is provided merely as an example and is not intended to limit the scope of the present disclosure. In various embodiments, rule information 108 may include multiple rules, which may specify different functionality of the user account to modify in response to different physical states of the mobile device 102. Additionally, in some embodiments, rule information 108 may specifies rules associated with multiple web services, including services not provided server system 110.

Figure 2:
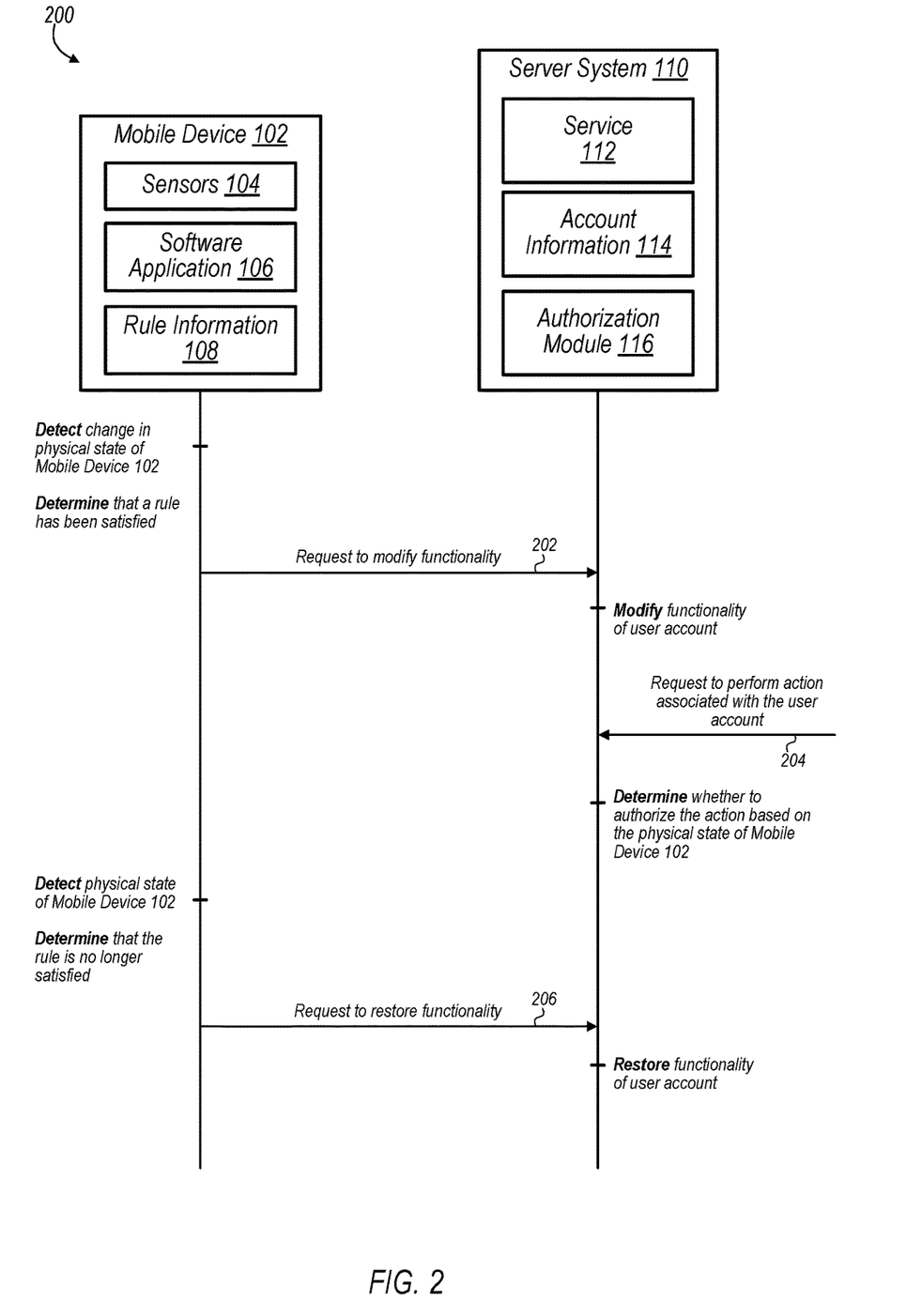
FIG. 2 is a communication diagram illustrating an example exchange between a server system and a mobile device to modify the functionality of a user account based on the physical state of the mobile device, according to some embodiments.

Turning now to FIG. 2, a communication diagram illustrating an example exchange 200 for modifying the functionality of a user account based on a physical state of a mobile device is depicted, according to some embodiments.

As noted above, mobile device 102 includes sensors 104 that are configured to detect various physical states of the mobile device 102. In the depicted embodiment, sensors 104 detect one or more changes in the physical state of device 102. Application 106 may then compare the current physical state of the mobile device 102 to rule information 108 to determine whether any rules associated with the service 112 have been satisfied. In continuing with the example above in which the service 112 is an online payment service, consider an instance in which rule information 108 includes a rule stating that, if mobile device 102 is determined to be placed in the user's pocket, then financial information associated with the user's account may not be accessed. For example, sensors 104 may detect changes in the radiant heat and ambient light present at the mobile device 102 (e.g., via one or more cameras, ambient light sensors, infrared sensors, etc.), which may indicate that the device 102 has been placed in the user's pocket. In such an embodiment, software application 106 may compare the physical state of the device 102 to the rule information 108 and determine that the above-specified rule has been satisfied.

At 202, in the depicted embodiment, mobile device 102 sends a request to server system 110 to modify the functionality of the user's account with service 112. In the example, 202 may include a request to disable access to financial information associated with the user's account. Although communication 202, in the depicted embodiment, includes a request to modify account functionality, note that, in other embodiments, 202 may instead include an indication of the physical state of the device 102, or may include information specifying a particular rule or rules that have been satisfied. In response to communication 202, server system 110 may modify the functionality of the user account accordingly, e.g., by modifying access permissions associated with the user account.

At 204, in the depicted embodiment, server system 110 receives a request to perform an action associated with the user of device 102's account. For example, communication 204 may be a request to access financial information with one or more financial accounts linked to the user's account. Note that, in the depicted embodiment, communication 202 is received from mobile device 102 prior to receiving the request at 204. In other embodiments, however, server system 110 may instead send a request, to mobile device 102, for physical state information in response to receiving the request at 204. In such embodiments, mobile device 102 may respond by sending information corresponding to the physical state of device 102, or information specifying which rules (if any) are currently satisfied. Stated differently, in various embodiments, physical state information may be sent to server system 110 either in near real-time (e.g., as different rules are satisfied), or such information may be retrieved from mobile device 102 reactively in response to a request to perform an action associated with the user's account.

Server system 110 may then determine whether to authorize the action, requested at communication 204, based on the physical state of the mobile device 102. For example, authorization module 116 may check access permissions associated with the user account and determine whether such an action is to be authorized. In the running example, for instance, authorization module 116 may check the access permissions associated with the user's account and determine that the request at 204 should be denied. In various embodiments, server system 110 may send a notification to mobile device 102 indicating that the requested action has been either authorized or denied.

As the physical states of the mobile device 102 change, different rules may be satisfied. Similarly, the physical state of the mobile device 102 may change such that rules that were satisfied no longer are. For instance, in the depicted embodiment, sensors 104 detect a change in the state of mobile device 102 and determine that the rule that was previously satisfied is not satisfied any more. For instance, the sensors may detect changes in the radiant heat and ambient light incident on the mobile device 102, and application 106 may determine that the device 102 is no longer in the user's pocket. In response to this determination, mobile device 102 may send a request 206 to the server system to restore the functionality associated with the user's account. For example, the communication 206 may be a request to restore one or more aspects of the user account's functionality to a previous state, such as before the particular rule was satisfied. Alternatively, in some embodiments, communication 206 may include an indication of the physical state of the device 102, or may include information specifying a particular rule or rules that are, or are not, satisfied. In response to 206, server system 110 may restore the previously modified functionality to the user account, e.g., by modifying the user account's access permissions.

Figure 3:
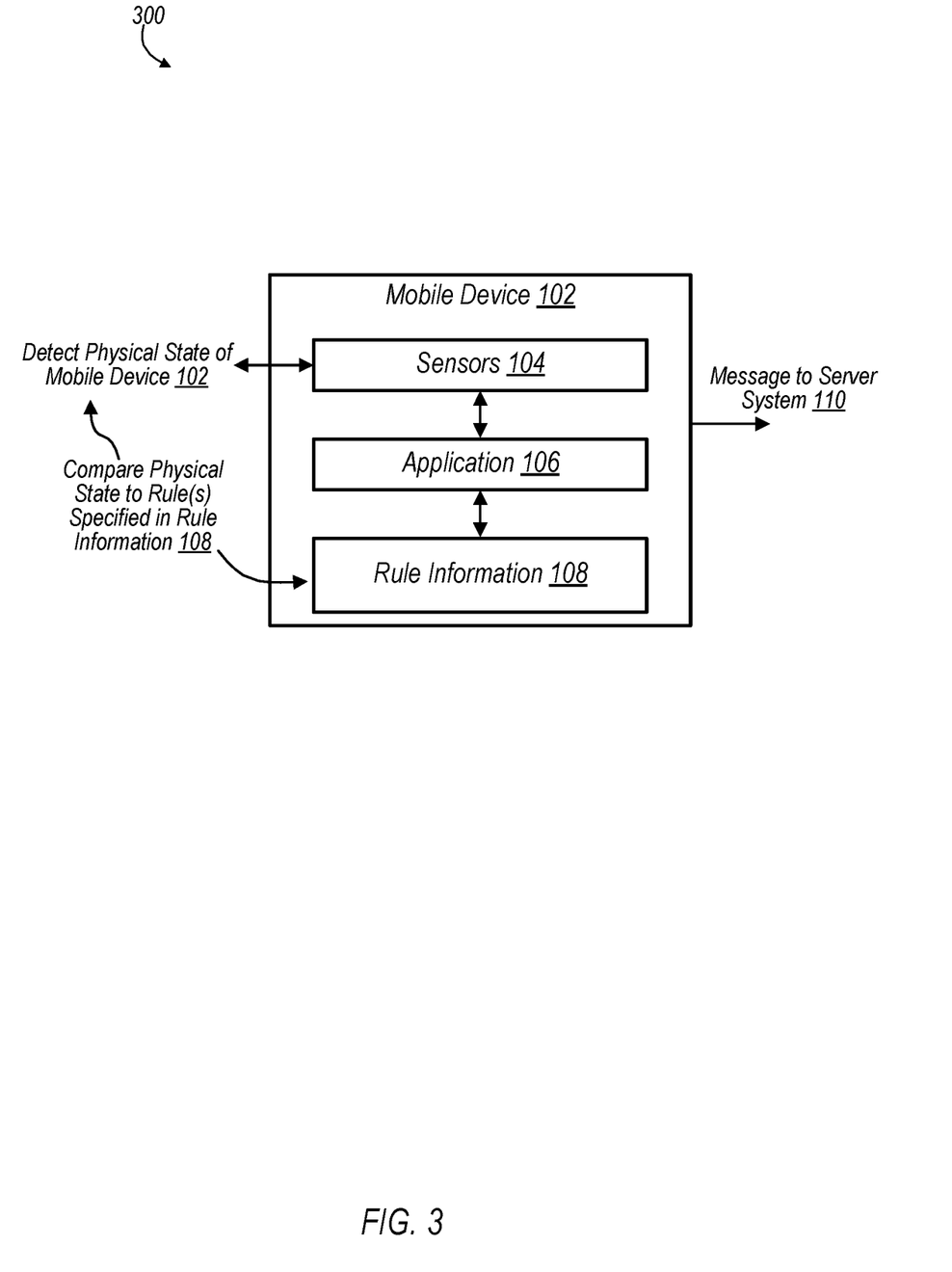
FIG. 3 is a block diagram illustrating an example mobile device, according to some embodiments.

Referring now to FIG. 3, a block diagram 300 illustrating an example mobile device 102 is depicted, according to some embodiments. Mobile device 102 may be any of various suitable mobile computing devices, such as a smartphone, tablet computer, laptop computer, wearable computing device (such as a fitness tracker or smart-watch), etc.

Mobile device 102 includes sensors 104, which may include any suitable combination of cameras, microphones, gyroscopes, magnetometers, accelerometers, proximity sensors (e.g., infrared LEDs or infrared light detectors), barometers, ambient light sensors, fingerprint scanners, or any other suitable sensing device configured to detect physical characteristics associated with the mobile device 102 or the environment in which mobile device 102 is operating. As noted above, the particular sensors 104 included in device 102 may vary depending on the nature of the mobile device being used. For example, the sensors 104 included in a smartphone may differ from the sensors included in a wearable computing device or a laptop. In various embodiments, however, the disclosed systems and methods may be implemented using various types of mobile devices 102.

In various embodiments, sensors 104 may detect various physical states associated with mobile device 102. For example, as noted above, sensors 104 may detect physical characteristics associated with the mobile device 102 such as its orientation, including whether it is positioned face-up or face-down, if it is being held in a landscape or portrait orientation, the viewing angle at which it is being held, etc. Further, in various embodiments, sensors 104 may detect other physical characteristics associated with the device 102, such as its height off of the ground, its power state (e.g., whether it is being charged, its remaining battery life, etc.), how long the device has been undisturbed (e.g., in an idle or standby operating mode), whether it is in the user's pocket, etc. Additionally, in various embodiments, sensors 104 may detect physical characteristics associated with the environment in which the mobile device 102 is located, such as its motion (e.g., whether it is in motion, its speed, its heading, etc.), the image of the person using the device 102, whether there are multiple people viewing the mobile device (e.g., whether there is a user looking over the primary user's shoulder), and audible sounds in the vicinity of the mobile device (e.g., voices, ambient noise, etc.). For example, in some embodiments, sensors 104 may include one or more microphones that may detect sounds indicative of the physical state of the device 102 or its environment. Further still, sensors 104 (e.g., a GPS unit) may be used to determine the geographical location of the mobile device 102, which, in some embodiments, may be used by the server system 110, in addition to the physical state information, to determine whether to authorize a requested action.

Mobile device 102 further includes rule information 108, which, in various embodiments, stores rules associated with one or more web services (such as service 112). In various embodiments, each such rule may include one or more conditions (e.g., particular physical states associated with the device 102) to be satisfied, and one or more modifications to account functionality to be made in response to the one or more conditions being satisfied. In some embodiments, a rule may specify multiple modifications to the functionality of service 112 in response to a single condition related to physical state being satisfied. Further, in some embodiments, a rule may specify multiple physical state conditions that must be satisfied before a particular modification to the functionality of service 112 will be requested. In some embodiments, rules may specify conditions corresponding to sounds detected by the device 102 that, if satisfied, cause certain modifications to account functionality for service 112. For example, in some embodiments, a rule may utilize voice recognition by comparing a voice detected by one or more microphones of device 102 with stored samples of an authorized user's voice. Such a rule may specify that, if the detected voice or voices do not match the authorized user's voice, one or more features may be temporarily modified. Further, in some embodiments, rules may be established that modify the functionality of the user account based on the ambient noise detected at device 102. As a non-limiting example, in some embodiments, a rule may be established specifying that if the device 102 detects certain ambient noises indicative of a crowded area, such as a subway or bus, one or more features of the user account (e.g., access to sensitive data, etc.) may be temporarily modified.

Further, in some embodiments, rules may specify conditions corresponding to the manner in which device 102 is being handled by a user. For example, in some embodiments, sensors 104 be configured to detect changes in the temperature of the device 102 and heat transferred to the device 102 by the user's hand or hands. In some instances, for example, sensors 104 may detect unique heat signatures based on whether and how the device 102 is being held by the user (e.g., whether the device 102 is laying on a table, being held with the right hand, left hand, both hands, etc.). Note that, in some instances, such heat signatures may be affected by items, such as rings, watches, etc., worn by the user, which may be useful in confirming whether the authorized user is the person holding device 102. Additionally, in some embodiments, sensors 104 may detect various fingerprints and palm-prints of the user as he or she handles the device 102, which may also be used to determine whether the authorized user is the person holding device 102. Any suitable combination of such conditions may be used, in various embodiments, in rules used to modify the functionality of user accounts for service 112.

Additionally, in some embodiments, rule information 108 may include authorization rules associated with multiple web services. In various embodiments, the rules for different web services may overlap (e.g., share triggering conditions or functionality modifications) or may be distinct. As one non-limiting example, consider an embodiment in which rule information 108 includes authorization rules associated with an online payment service and an email service. In such an embodiment, rule information 108 may include a rule stating that, if the mobile device 102 is positioned face-down, no outgoing payments may be made via user's account with the online payment service and no outgoing emails may be sent via the user's email account with the email service. In the event that the user then positioned the mobile device 102 face-down, the mobile device may send messages to server systems associated with both web services, requesting the respective modifications in account functionality. Alternatively, in some embodiments, the mobile device may instead send a message to a single server system associated with one of the web services, which may then send a request to the other server system associated with the other web service, as described in more detail below. In some embodiments, rule information 108 is stored on a non-transitory, computer-readable medium included in (or accessible to) mobile device 102.

Mobile device 102 also includes software application 106, which, in various embodiments, is operable to compare the physical state of device 102 the rule information 108 to determine if any of the set of rules has been satisfied. In some embodiments, software application 106 may be an application associated with service 112. For example, in an embodiment in which service 112 is an online payment service, application 106 may be a software application associated with the online payment service that, in addition to the various authorization operations described herein, may be used to send and receive online payments. In other embodiments, application 106 may be a separate software application operable to perform authentication or authorization operations for one or more web services. Additionally, in some embodiments, some or all of the functionality described relative to software application 106 may be performed by one or more components of the operating system of mobile device 102 (e.g., instead of or in addition to application 106).

In some embodiments, application 106 may enable a user to modify rule information 108. For example, in some embodiments, application 106 may include an interface that may be used to create new authorization rules, or delete or modify existing authorization rules. Further, in some embodiments, application 106 may allow the user to enable or disable the disclosed systems and methods for modifying account functionality based on the physical state of device 102. In various embodiments, information regarding modifications to rule information 108, or whether the physical state-based authorization is enabled, may be sent to the server system 110 so that it may process requests to perform actions associated with the user account accordingly. Note that, in various embodiments, some or all of rule information 108 may be stored in a storage device included in or accessible to server system 110 (e.g., instead of or in addition to being stored by mobile device 102).

In response to a determination that one or more rules has been satisfied, mobile device 102 may send a message to server system 110. As noted above, the information included in such a message may vary. For example, in some embodiments, the message may include a request specifying modifications to be made to the functionality of the user account. In other embodiments, the message may instead indicate the physical state(s) of the mobile device 102, which the server system 110 may use to determine whether any rules have been satisfied. In still other embodiments, the message may specify which rule, of a set of rules, has been satisfied based on the physical state of the mobile device 102. Note that, in various embodiments, more than one rule may be satisfied at a time, based on the physical state of the mobile device 102. In the event that multiple rules are satisfied, mobile device 102 may transmit multiple messages to server systems associated with the corresponding web service (or services), or may instead communicate that information in a single message to the server system 110.

Further note that, in various embodiments, mobile device 102 (or server system 110) may store information corresponding to the various physical states of the mobile device 102. This information may include, for example, the times at which the device 102 is charged, the viewing angle (or range of viewing angles) most commonly used, the amount of time (or times) during which the device 102 is positioned face-down or face-up, the amount of time (or times) at which the device is in motion above a threshold speed, whether the device 102 is used in a portrait or landscape orientation, etc. Further, in some embodiments, information corresponding to the geographical location of the mobile device 102 over time may similarly be stored. Based on this physical state or geographic location information, the mobile device 102 (or server system 110) may detect certain patterns associated with the use and physical state of the mobile device. These patterns, in various embodiments, may be used to create one or more profiles for the mobile device, which indicate the various physical states mobile device 102 is expected to encounter in a given day, week, etc. These patterns may be reinforced by the application 106 prompting the user to confirm a given rule in response to detecting a particular physical state. Further, in various embodiments, such a profile may be used to detect uncommon physical states of the mobile device 102. In some embodiments, in response to detecting physical states that deviate from the profile, application 106 may take various actions, such as suspending one or more authorization rules, prompt the user to verify whether the rules are still to be applied, etc.

Figure 4:
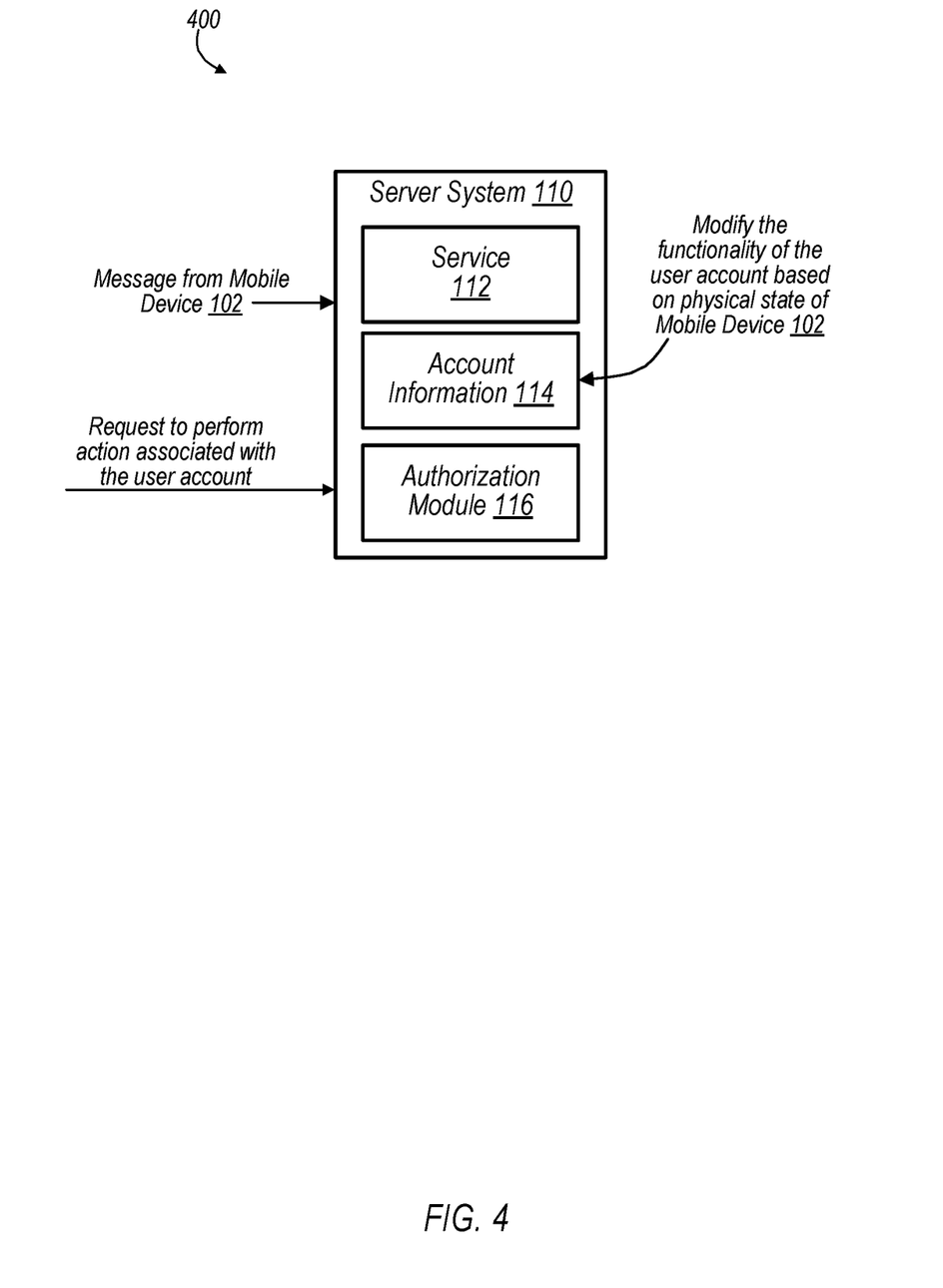
FIG. 4 is a block diagram illustrating an example server system, according to some embodiments.

Turning now to FIG. 4, a block diagram 400 illustrating an example server system 110 is depicted, according to some embodiments. In various embodiments, server system 110 is operable to modify the functionality of a user account based on a physical state of a mobile device 102.

In the depicted embodiment, server system 110 provides web service 112 to various remote users via one or more communication networks. Service 112 may be any of various suitable web services, such as an email service, streaming service, online payment service, or any other suitable web service 112. Server system 110 further includes (or has access to) account information 114 associated with various user accounts with the service 112. Account information 114 may include, in various embodiments, access permissions for the user accounts, information regarding the mobile device(s) associated with various user accounts, information associated with the web service 112, etc.

Server system 110 further includes authorization module 116, which, in various embodiments, is operable to determine whether to authorize requests from various end users. For example, in the depicted embodiment, server system 110 receives a request to perform an action associated with a particular user account. In some embodiments, this request may be received from a user that has already been authenticated to the particular user account. In various embodiments, authorization module 116 may determine whether to authorize the request based, at least in part, on the physical state of the mobile device 102 associated with the particular user account. For example, in response to the request, server system 110 may access information indicative of the current physical state of the mobile device 102 (e.g., its physical orientation, power mode, etc.). As noted above, this information may be accessed in various ways. For example, in some embodiments, such physical state information may be sent by device 102 to the server system 110 at or near the time that the physical state changes, such that the information indicative of the current physical state of device 102 is already reflected by the account information when the request is received. In other embodiments, however, server system 110 may access the information by requesting it from mobile device 102 in response to the request. Once it has access this physical state information, authorization module 116 may determine whether to authorize the request based on the state of mobile device 102.

Thus, in various embodiments, server system 110 is operable to modify the functionality of a user's account with a service 112 based on the physical state of the user's mobile device 102. For instance, in continuing with the example above in which service 112 is an online payment service, server system 110 may make various modifications to the functionality of a user account, such as suspending incoming or outgoing payments, limiting the dollar amount of payments, suspending updates or notifications, preventing access to financial information, suspending the ability to modify account information (such as user credentials), etc. Note, however, that these embodiments are provided merely as examples and are not intended to limit the scope of the present disclosure.

Additionally, as noted above, the physical state of mobile device 102 may be used to modify the functionality of multiple web services provided by multiple server systems, according to some embodiments. In some such embodiments, server system 110 may be operable to facilitate modification of the user account functionalities for those other services. For example, once server system 110 receives an indication of the physical state of the mobile device 102 (or an indication of the rule(s) that have been satisfied), server system 110 may send a message (e.g., as an API call) to one or more other server systems. In various embodiments, these messages may either include a request to modify one or more functionalities of the services provided by server systems, or may indicate the physical state of the mobile device 102, which the respective server systems may use to determine which aspects of their functionality to modify (if any).

Note that, in various embodiments, server system 110 may include an authentication module (not shown, for clarity) operable to authenticate a user to a user account prior to providing access to the service 112. This authentication module may use any of various suitable single- or multi-factor authentication techniques. Note, however, that in some embodiments, the disclosed systems and methods discussed with reference to authorization of a request based on the physical state of device 102 may also be applied in the context of authenticating a user to a user account. That is, in some embodiments, users may establish one or more rules that utilize the physical state of the mobile device 102 as a factor used during the authentication process, e.g., instead of or in addition to using the physical state in the request-authorization process, as disclosed herein. As one non-limiting example, a user may establish a rule providing that a user is not to be authorized to the user account if the mobile device 102 is oriented in a face-down position. Note, however, that this embodiment is provided merely as an example and other various rules may be established, as discussed herein, and used for the authentication process.

Example Methods

Figure 5:
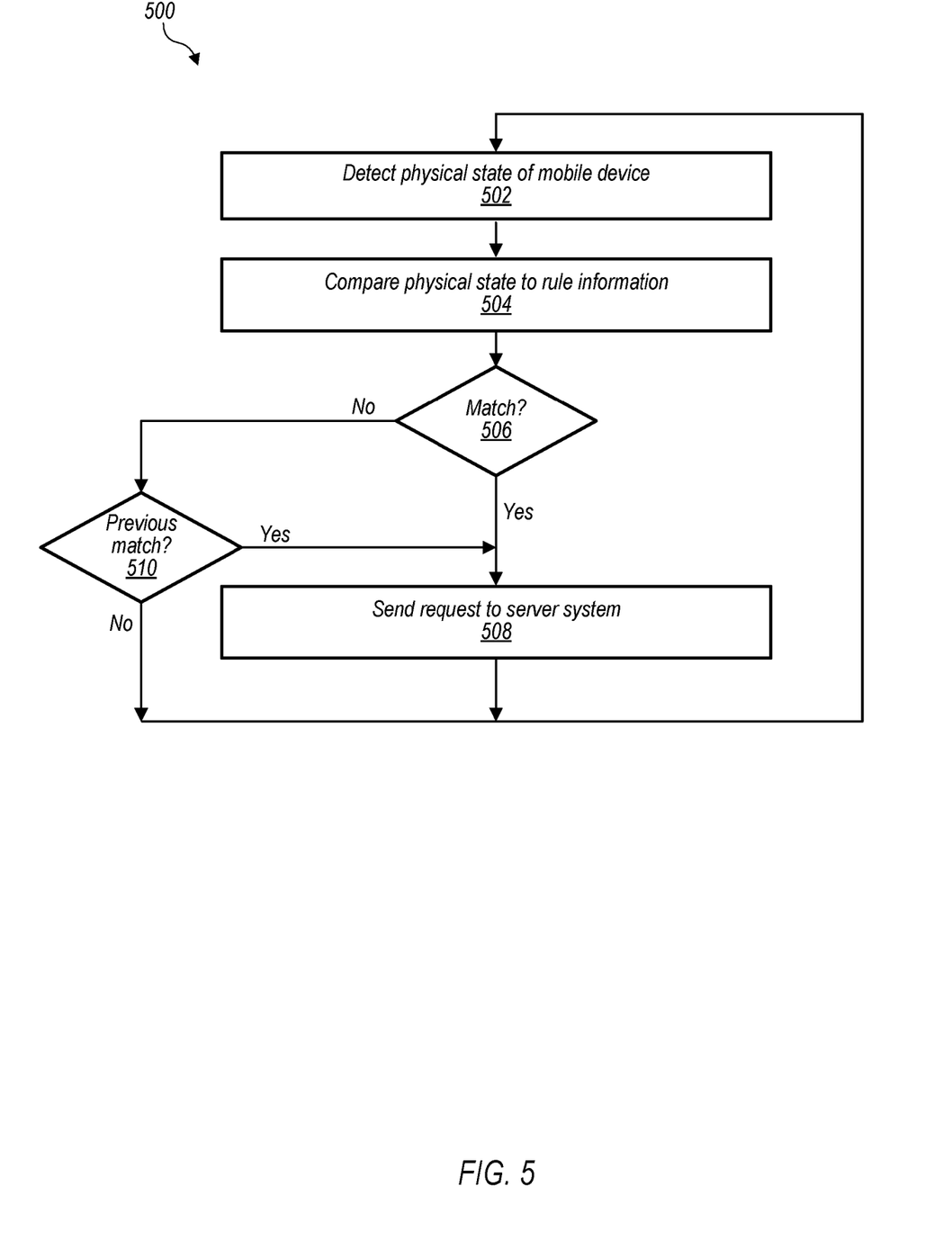
FIG. 5 is a flow diagram illustrating an example method, performed by a mobile device, for modifying account functionality based on a physical state of the mobile device, according to some embodiments.

Referring now to FIG. 5, a flow diagram illustrating an example method 500 for modifying account functionality based on a physical state of a mobile device is depicted, according to some embodiments. In various embodiments, method 500 may be performed by mobile device 102 of FIG. 1 to modify the functionality of a user's account with service 112 provided by server system 110. For example, mobile device 102 may include (or have access to) a non-transitory, computer-readable medium having program instructions stored thereon that are executable by the mobile device 102 to cause the operations described with reference to FIG. 5. In FIG. 5, method 500 includes elements 502-510. While these elements are shown in a particular order for ease of understanding, other orders may be used. In various embodiments, some of the method elements may be performed concurrently, in a different order than shown, or may be omitted. Additional method elements may also be performed as desired.

At 502, in the illustrated embodiment, the mobile device detects one or more physical states associated with the mobile device. For example, sensors 104 may detect one or more physical states, or changes in physical states, associated with device 102. In some embodiments, the one or more physical states include at least one of a physical orientation of the mobile device or a power mode of the mobile device. At 504, in the illustrated embodiment, the one or more physical states are compared to a set of rules for a user account associated with a user, where a given one of the set of rules specifies one or more functionalities, of the user account, to modify in response to one or more of the set of rules being satisfied. For example, software application 106 may compare the physical states with one or more rules specified in rule information 108.

Method 500 then proceeds to element 506, which determines whether the physical state of the mobile device satisfy any of the rules included in rule information 108. If so, method 500 then proceeds to element 508, in which, in response to the one or more physical states satisfying a first rule of the set of rules, a request is sent, without explicit user input, to a server system associated with the user account to modify one or more functionalities associated with the user account. As noted above, in some embodiments, more than one authorization rules may be satisfied at the same time. In some embodiments, in response to the one or more physical states of the mobile device satisfying a second, different rule of the set of rules, method 500 may include sending, to the server system, a request to modify one or more additional functionalities associated with the user account. Further, as noted above, rule information 108 may include authorization rules that modify the functionality of multiple web services based on the physical state of the mobile device 102. In some such embodiments, in response to the one or more physical states satisfying the first rule, method 500 may include sending a second request to a different server system associated with a different user account, where the second request specifies one or more functionalities of the different user account to modify based on the current physical state of the mobile device 102.

If, however, at element 506, the physical state of the mobile device does not satisfy any of the rules included in rule information 108, method 500 proceeds to element 510, which determines whether the physical state of the mobile device previously matched any of the one or more rules. If not, method 500 then proceeds back to element 502, where the process may be repeated, if desired. If, however, the physical state of mobile device 102 previously did, but no longer does, match one or more rules, method 500 proceeds to element 508. For example, in some embodiments, sensors 104 may subsequently detect a change in the one or more physical states associated with the mobile device and, in response to determining that the one or more physical states no longer satisfy the first rule, mobile device 102 may send a subsequent request to the server system 110 to restore the one or more functionalities associated with the user account to a previous state.

In some embodiments, method 500 may further include storing, by the mobile device, information corresponding to a physical state of the mobile device over a period of time and determining a physical state profile for the mobile device based on the information. Further, in some embodiments, method 500 may include suspending one or more of the set of rules in response to the one or more physical states associated with the mobile device indicating that the mobile device has deviated from the physical state profile.

Figure 6:
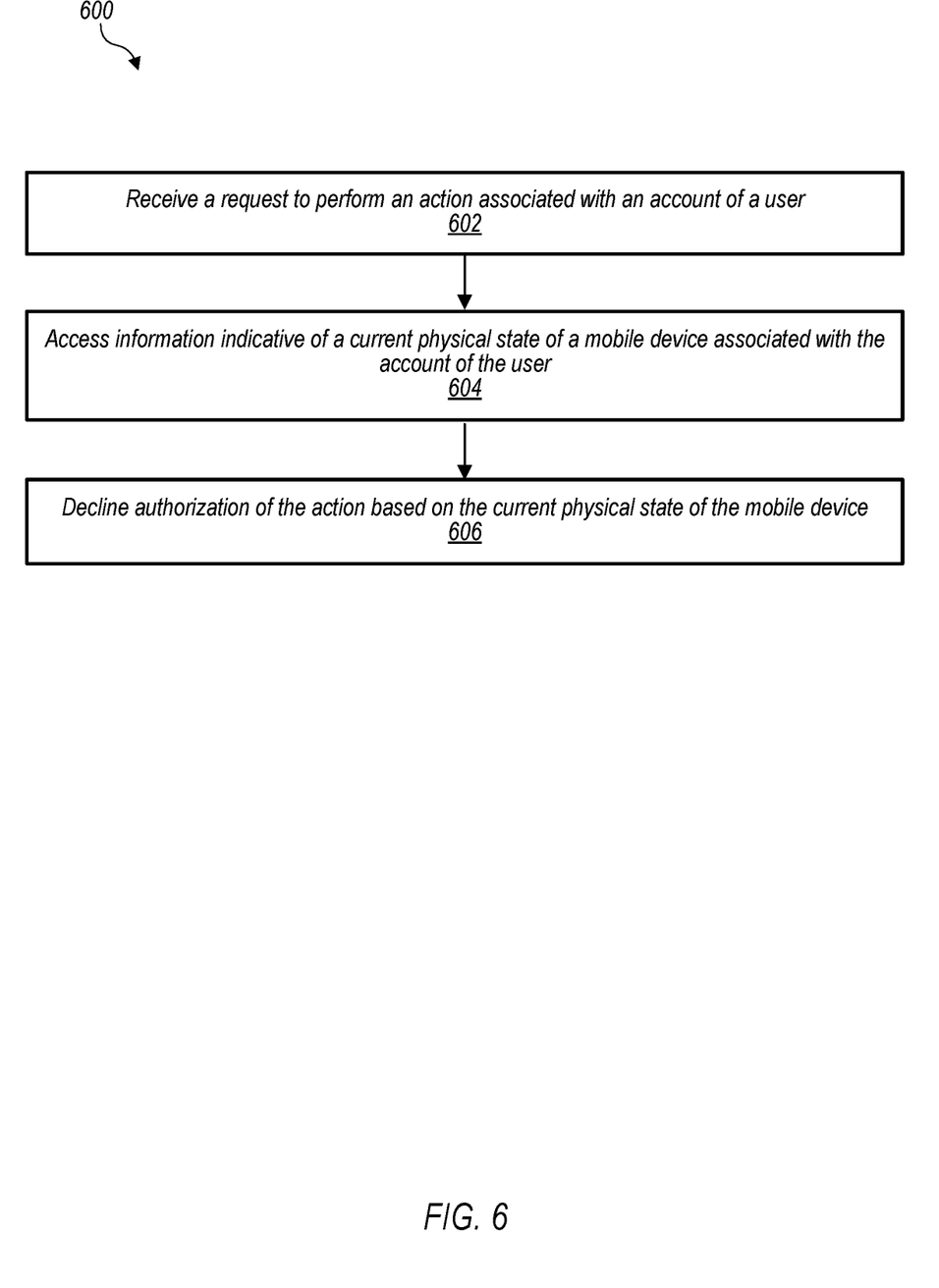
FIG. 6 is a flow diagram illustrating an example method, performed by a server system, for modifying account functionality based on a physical state of a mobile device, according to some embodiments.

Turning now to FIG. 6, a flow diagram illustrating an example method 600 for modifying account functionality based on a physical state of a mobile device is depicted, according to some embodiments. In various embodiments, method 600 may be performed by server system 110 of FIG. 1 to modify the functionality of a user's account with service 112 based on the physical state of mobile device 102. For example, server system 110 may include (or have access to) a non-transitory, computer-readable medium having program instructions stored thereon that are executable by the server system 110 to cause the operations described with reference to FIG. 6. In FIG. 6, method 600 includes elements 602-606. While these elements are shown in a particular order for ease of understanding, other orders may be used. In various embodiments, some of the method elements may be performed concurrently, in a different order than shown, or may be omitted. Additional method elements may also be performed as desired.

At 602, in the depicted embodiment, the server system receives a request to perform an action associated with an account of a user. For example, server system 110 may receive a request to perform an action associated with an account of a user of mobile device 102. In some embodiments, the request is received from a computing device different from the mobile device associated with the account of the user.

At 604, in the depicted embodiment, the server system accesses information indicative of a current physical state of a mobile device associated with the account of the user. In some embodiments, for example, the information specifies at least one of a physical orientation of the mobile device or a power mode of the mobile device. In some embodiments, such information may be received, from the mobile device, prior to receiving the request in element 602. Further, in some embodiments, accessing the information includes sending a message to the mobile device requesting the information (e.g., orientation information) in response to receiving the request to perform the action, and receiving, from the mobile device, the information indicative of the current orientation of the mobile device. Note that, in some embodiments, the request received at element 602 may be from the mobile device of the user and may include orientation information.

At 606, in the depicted embodiment, the server system declines authorization of the action based on the current physical state of the mobile device. For example, in one embodiment, element 606 may include declining authorization of the action in response to the orientation information indicating that a face-down orientation of the mobile device. In some embodiments, method 600 may further include accessing location information associated with a current location of the mobile device, where declining authorization of the action is further based on the current location of the mobile device. Further, in some embodiments, the declining authorization of the action is performed in response to the information indicating that the mobile device is positioned in one of a first set of physical orientations. In other embodiments, method 600 may further include authorizing a second request to perform a second action associated with the account of the user in response to the information indicating that the mobile device is positioned in one of a second set of physical orientations. Note that, in some embodiments, the first set of physical orientations includes a face-down orientation of the mobile device, and the second set of physical orientations includes a face-up orientation of the mobile device.

Additionally, as discussed above, the physical state of mobile device 102 may be used to modify the functionality of multiple web services provided by multiple server systems, according to some embodiments. In some such embodiments, server system 110 may facilitate modification of the user account functionalities for those other services. For example, in some embodiments, method 600 further comprises sending a request to a different server system associated with a different account of the user, where the request specifies on or more functionalities of the different account to modify based on the current physical state of the mobile device of the user.

Example Computer System

Figure 7:
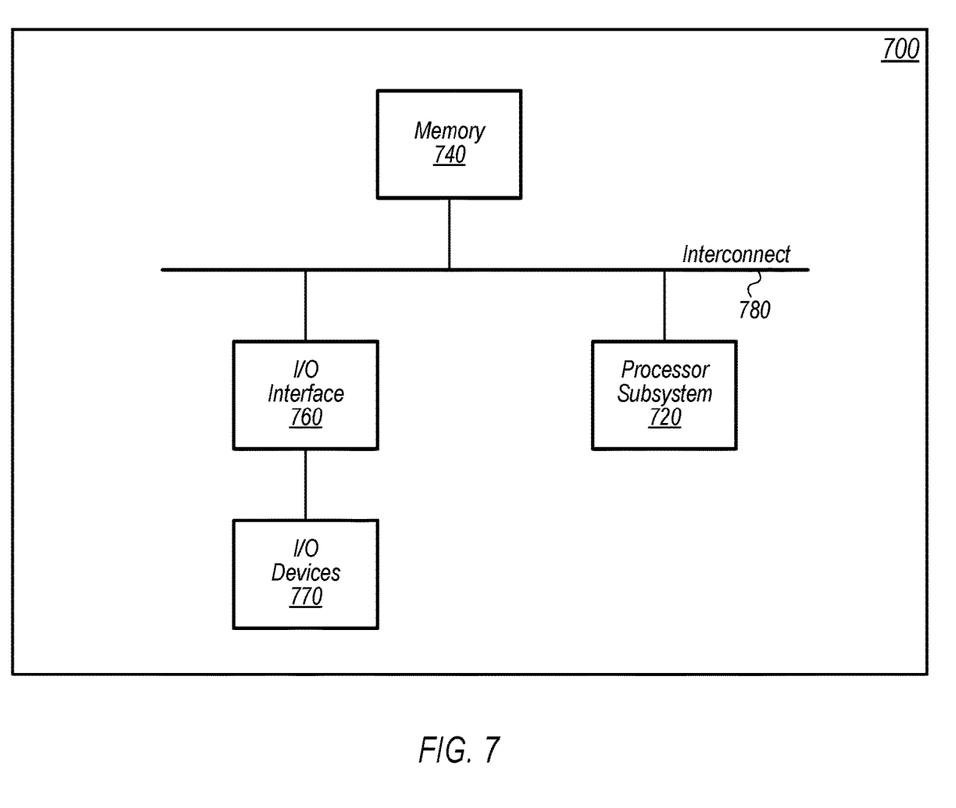
FIG. 7 is a block diagram illustrating an example computer system, according to some embodiments.

Referring now to FIG. 7, a block diagram of an example computer system 700 is depicted, which may implement one or more computer systems, such as mobile device 102 or server system 110 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. When used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., authorization module 116). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
accessing, by a server system, information indicative of a physical state of a mobile device;
based on the information indicative of the physical state of the mobile device, the server system:
disabling particular function of a first user account of a first computer service provided by the server system, the first user account being associated with a user of the mobile device; and
sending a modification request to a different server system associated with a second computer service different from the first computer service, wherein the modification request specifies a modification of one or more functionalities of a second user account of the second computer service, wherein the second user account is also associated with the user and is different from the first user account;
receiving, by the server system from a computer system distinct from the mobile device, a request to perform the particular function for the first user account;
in response to the request, determining, by the server system, that the particular function is disabled for the first user account; and
declining, by the server system, the request to perform the particular function for the first user account.

2. The method of claim 1, wherein the information indicative of the physical state of the mobile device includes information indicative of a physical orientation of the mobile device, and wherein the disabling the particular function of the first computer service for the first user account is performed in response to the information indicative of the physical orientation indicating that the mobile device is in a face-down orientation.

3. The method of claim 1, further comprising:
accessing, by the server system, location information associated with a current location of the mobile device, wherein the declining is further based on the current location of the mobile device.

4. The method of claim 1, wherein the accessing the information indicative of the physical state of the mobile device includes receiving the information from a third computer service that is different from the first and second computer services.

5. The method of claim 1, wherein the information indicative of the physical state of the mobile device is based on sensor data from the mobile device, and wherein the server system is configured to use the information to determine an identifier of a particular rule that has been satisfied, and wherein the particular rule specifies, based on the information, that the particular function of the first computer service is to be disabled for the first user account.

6. The method of claim 1, wherein the information indicative of the physical state of the mobile device is a first request, generated by the mobile device based on sensor data, to modify the particular function available to the first user account via the first computer service provided by the server system.

7. The method of claim 1, wherein the one or more functionalities of the second user account specified to be modified in the modification request are different from the particular function that is disabled.

8. The method of claim 1, wherein the information indicative of the physical state of the mobile device indicates whether a battery level satisfies a threshold amount.

9. A non-transitory, computer-readable medium having instructions stored thereon that are capable of execution by a server system to perform operations comprising:

accessing information indicative of a physical state of a mobile device associated with a user account of a user;

based on the information indicative of the physical state of the mobile device, disabling a particular function of a first user account of a first computer service provided by the server system, the first user account being associated with a user of the mobile device;

sending a modification request to a different server system associated with a second computer service different from the first computer service, wherein the modification request specifies modification of one or more functionalities of a second user account of the second computer service, wherein the second user account is also associated with the user and is different from the first user account;

subsequently receiving, from a computer system distinct from the mobile device, a request to perform the particular function for the first user account;

in response to the request, determining that the particular function is currently disabled for the first user account; and declining authorization of the particular function without explicit user input from the user.

10. The non-transitory, computer-readable medium of claim 8, wherein the information indicative of the physical state of the mobile device specifies at least one of a physical orientation of the mobile device or a power mode of the mobile device.

11. The non-transitory, computer-readable medium of claim 10, wherein the disabling the particular function of the first computer service for the first user account is performed in response to the information indicating that the mobile device is positioned in one of a first set of physical orientations.

12. The non-transitory, computer-readable medium of claim 11, wherein the operations further comprise:

subsequent to the declining the authorization, receiving second information indicative of the physical state of the mobile device;

based on the second information, enabling, for the first user account, the particular function of the first computer service;

subsequently receiving a second request to perform the particular function for the first user account; and authorizing the second request to perform the particular function for the first user account.

13. The non-transitory, computer-readable medium of claim 9, wherein the particular function of the first user account and the specified modification of one or more functionalities of the second user account are different.

14. The non-transitory, computer-readable medium of claim 9, wherein the information indicative of the physical state of the mobile device indicates whether the mobile device is currently in motion.

15. A method, comprising:

receiving, from a first server system at a second server system, a modification request, wherein the modification request is initiated by the first server system in response to a prior request indicative of a physical state of a mobile device of a user, to disable a first function of a first user account of a first computer service provided by the first server system, wherein the modification request specifies modification of a second, different function of a second user account of a second computer service provided by the second server system, and wherein the first and second user accounts are different from one another and are both associated with the user;

after the modification request, receiving, at the second server system, a subsequent request to perform the second function of the second user account;

in response to the subsequent request, determining, by the second server system, that the second function is disabled for the second user account; and declining, by the second server system, to perform the second function for the second user account.

16. The method of claim 15, further comprising:

receiving, by the second server system, a second modification request, wherein the second modification request is initiated by the first server system to enable the second function of the second user account.

17. The method of claim 15, further comprising:

in response to the modification request, modifying, by the second server system, access permissions associated with the second user account to disable the second function for the second user account, wherein the determining that the second function is disabled is performed based on the modified access permissions.

18. The method of claim 15, wherein the prior request is received from a mobile device of the user.

19. The method of claim 15, wherein the prior request indicates that the mobile device is damaged.

* * * * *